(12) United States Patent
Gutenmann et al.

(10) Patent No.: US 10,892,620 B2
(45) Date of Patent: Jan. 12, 2021

(54) STATE OF CHARGE MAINTENANCE DURING OPERATION OF ENERGY STORAGE SYSTEMS

(71) Applicant: General Electric Company, Schenectady, NY (US)

(72) Inventors: David Alan Gutenmann, Clifton Park, NY (US); Richard Hayes Cutright, Corinth, NY (US); Kenneth McClellan Rush, Ballston Spa, NY (US); Joshua Paul Webb, Schenectady, NY (US); Lukas Mercer Hansen, Niskayuna, NY (US); Charles Clarence Hicks, Jr., Loudonville, NY (US)

(73) Assignee: General Electric Company, Schenectady, NY (US)

( * ) Notice: Subject to any disclaimer, the term of this patent is extended or adjusted under 35 U.S.C. 154(b) by 1249 days.

(21) Appl. No.: 14/941,730

(22) Filed: Nov. 16, 2015

(65) Prior Publication Data
US 2017/0141576 A1    May 18, 2017

(51) Int. Cl.
*H02J 3/38* (2006.01)
*H02J 3/32* (2006.01)
*H02J 13/00* (2006.01)

(52) U.S. Cl.
CPC ............... *H02J 3/383* (2013.01); *H02J 3/32* (2013.01); *H02J 3/386* (2013.01); *H02J 3/381* (2013.01); *H02J 13/0006* (2013.01); *Y02E 10/56* (2013.01); *Y02E 10/76* (2013.01); *Y02E 40/70* (2013.01); *Y02E 60/00* (2013.01); *Y02E 70/30* (2013.01); *Y04S 10/12* (2013.01); *Y04S 10/123* (2013.01); *Y04S 10/14* (2013.01)

(58) Field of Classification Search
CPC ... H02J 3/383; H02J 3/32; H02J 3/386; Y02E 10/563
See application file for complete search history.

(56) References Cited

U.S. PATENT DOCUMENTS

| | | | |
|---|---|---|---|
| 2013/0190939 A1* | 7/2013 | Lenox ..................... | H02J 3/383 700/291 |
| 2014/0025215 A1* | 1/2014 | Carlson .................... | H02J 7/35 700/292 |
| 2014/0239913 A1* | 8/2014 | Kudo ...................... | H02J 7/007 320/134 |

(Continued)

OTHER PUBLICATIONS https://www.gridpoint.com/understanding-electric-consumption-demand-charges/Gridpoint, Understanding Electric Consumption & Demand Charges, Rod McCrea, Jun. 2, 2017.*

*Primary Examiner* — Alfonso Perez Borroto
(74) *Attorney, Agent, or Firm* — Dority & Manning, P.A.

(57) ABSTRACT

Systems and methods for controlling an energy storage system are provided. In one embodiment, a method for controlling an energy storage system includes receiving a power demand associated with a grid service operation for an energy storage system and accessing data indicative of a time shift for responding to the power demand. The method includes implementing the time shift in the power demand to obtain a time shifted power demand; and controlling the charge or discharge of one or more energy storage devices in the energy storage system based at least in part on the time shifted power demand.

5 Claims, 5 Drawing Sheets

(56) References Cited

U.S. PATENT DOCUMENTS

| | | | |
|---|---|---|---|
| 2015/0066228 A1* | 3/2015 | Clifton | G05F 1/66 700/295 |
| 2016/0233682 A1* | 8/2016 | Do Rosario | H02J 3/387 |
| 2017/0141576 A1* | 5/2017 | Gutennnann | H02J 3/32 |

* cited by examiner

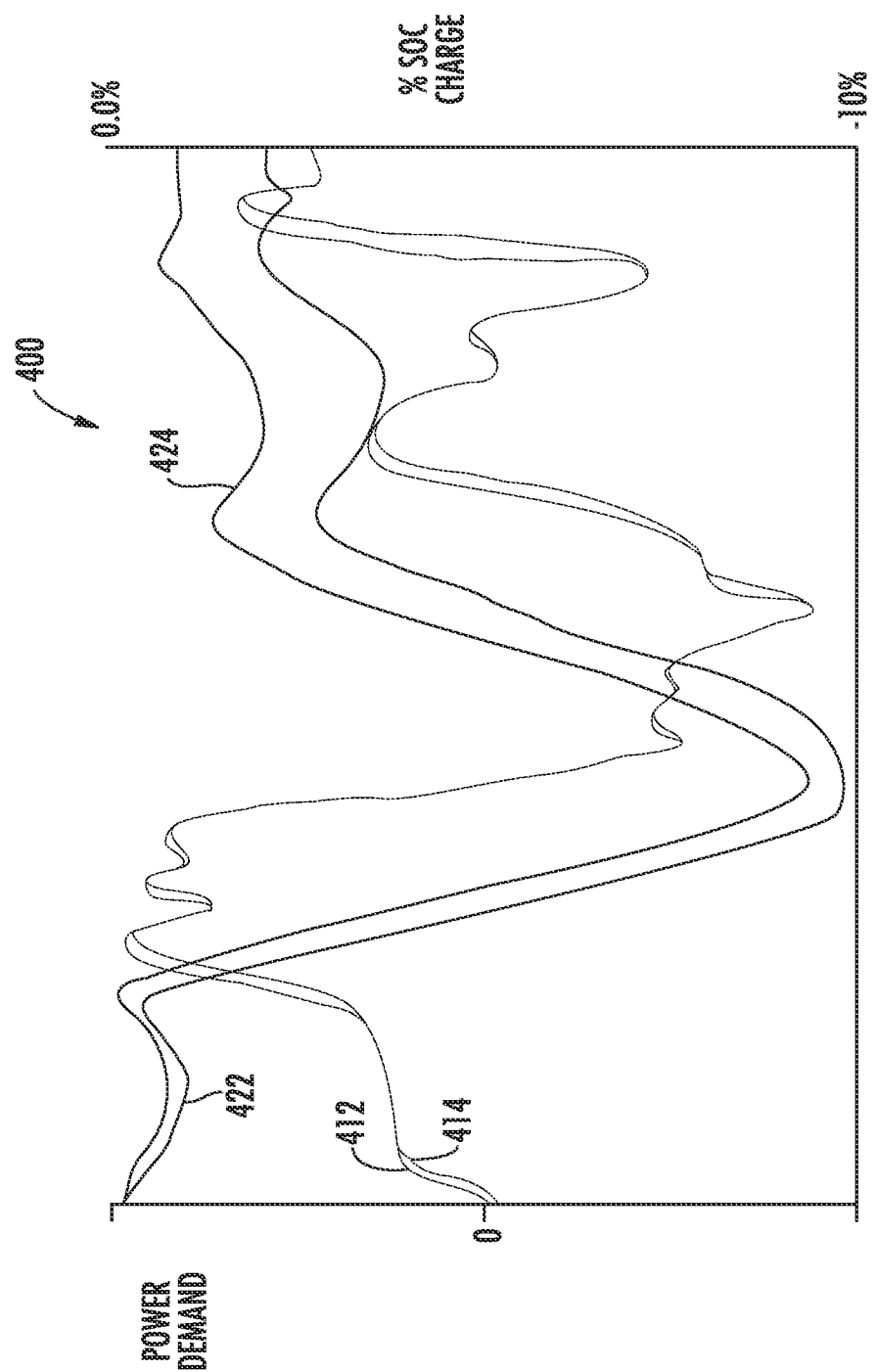

STATE OF CHARGE MAINTENANCE DURING OPERATION OF ENERGY STORAGE SYSTEMS

FIELD OF THE INVENTION

The present subject matter relates generally to energy storage systems.

BACKGROUND OF THE INVENTION

Energy storage systems (e.g., battery energy storage systems) have become increasingly used to deliver power either as part of standalone energy storage systems or as part of power generation systems (e.g., a wind farm, solar farm, gas turbine system) with an integrated energy storage system. Energy storage systems are unique in that energy storage systems have the ability to both deliver and reserve energy for particular services. Energy storage systems can include one or more battery banks that can be coupled to the grid or other load via a suitable power converter.

Energy storage systems can be used for frequency regulation of an electrical grid. For instance, a power demand can be provided from a utility or other operator of a grid that requests delivery or absorption of a particular amount of power (e.g., 1 MW) for a certain time period to regulate the frequency of the electrical grid. In some circumstance, if the power demands are not energy balanced, a state of charge of one or more energy storage devices used in the energy storage system can be depleted or hit a ceiling over time. This can require that the energy storage system be controlled to stop providing the grid service during an intervention period so that the energy storage devices can be charged or discharged to a suitable state of charge level.

BRIEF DESCRIPTION OF THE INVENTION

Aspects and advantages of the embodiments of the present disclosure will be set forth in part in the following description, or can be learned from the description, or can be learned through practice of the embodiments.

One example aspect of the present disclosure is directed to a method for controlling an energy storage system. The method includes receiving, by one or more control devices, a power demand associated with a grid service operation for an energy storage system. The method includes accessing, by the one or more control devices, data indicative of one or more time shifts for responding to the power demand and generating, by the one or more control devices, a time shifted power demand based at least in part on the one or more time shifts. The method further includes controlling, by the one or more control devices, power delivery to or from the one or more energy storage devices in the energy storage system based at least in part on the time shifted power demand.

Another example aspect of the present disclosure is directed to a power system. The power system includes one or more energy storage devices and a power converter configured to convert power associated with the one or more energy storage devices to an alternating current power. The power system can further include a control system having one or more control devices. The control system can be configured to implement a time shift in a power demand associated with a frequency regulation operation to obtain a time shifted power demand. The control system can be configured to control the power converter to charge or discharge the one or more energy storage devices based at least in part on the time shifted power demand. The time shift can be implemented in the time shifted power demand when the power demand is increasing.

Yet another example aspect of the present disclosure is directed to a control system for controlling an energy storage system. The control system includes one or more processors and one or more memory devices. The one or more memory devices store computer-readable instructions that when executed by one or more processors cause the one or more processors to perform operations. The operations include receiving a power demand associated with a frequency regulation operation for an energy storage system; accessing data indicative of a time shift for responding to the power demand; implementing the time shift during increases in the power demand to obtain a time shifted power demand; and controlling the charge or discharge of one or more energy storage devices in the energy storage system based at least in part on the time shifted power demand to increase energy balance of the energy storage system during the frequency regulation operation.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 5 depicts a graphical representation associated with operations of an energy storage system according to example embodiments of the present disclosure.

DETAILED DESCRIPTION OF THE INVENTION

Figure 1:
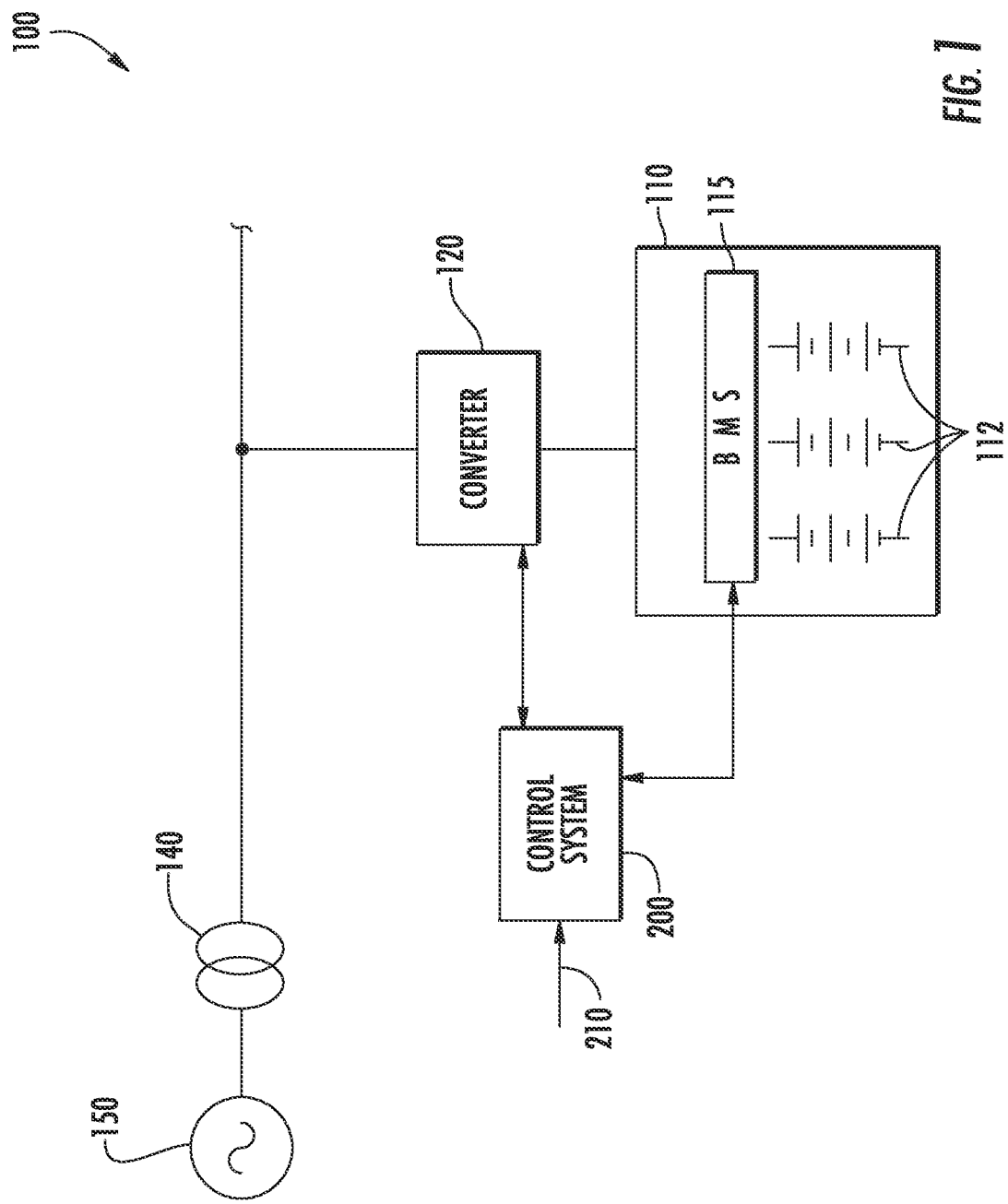
FIG. 1 depicts an energy storage system according to example embodiments of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Example aspects of the present disclosure are directed to controlling an energy storage system. In some embodiments, the energy storage system can be controlled to increase or decrease (maintain) energy balance during the performance of a grid service operation, such as a frequency regulation operation for a utility grid. More particularly, a power demand associated with the grid service operation can be received at one or more control devices associated with the energy storage system. The power demand can specify an amount of power to be discharged from or provided to the energy storage system. According to particular aspects of the present disclosure, a time shift is implemented in the power demand under certain conditions (e.g., when the power demand is increasing) to obtain a time shifted power demand. The energy storage system can be controlled based on the time shifted power demand to provide the grid service operation with a slight delay relative to the power demand.

For example, in some embodiments, a time shift can be implemented when the power demand is increasing. The time shift is not implemented when the power demand is not increasing (e.g. is maintained or decreasing). In other embodiments, a first time shift can be implemented under certain power demand conditions (e.g., the power demand is increasing). A second time shift that is different than the first time shift can be implemented under other power demand conditions (e.g., the power demand is decreasing).

The implementation of the time shift under selected operating conditions in the power demand can allow for the energy storage system to increase energy balance during performance of the grid service operation. As used herein, increased energy balance is achieved when state of charge increase or decrease of one or more energy storage devices is reduced during performance of the grid service operation.

According to particular aspects of the present disclosure, the duration of the time shift can be selected based at least in part on a performance rating for the energy storage system. The performance rating can be indicative of the responsiveness of the energy storage system to the power demand associated with the grid service operation. In some embodiments, the duration of the time shift can be selected based at least in part on the performance rating such that the time shift does not have too large of an effect on the performance rating. For instance, the time shift can be selected such that the difference in performance rating caused by the time shift is less than a threshold.

In some embodiments, the duration of time shift can be in the range of about 1.5 second to about 50 seconds, such as about 3 seconds to about 40 seconds, such as about 10 seconds to about 20 seconds. The inventors have discovered that time shifts in these ranges implemented while the power demand is increasing can provide for increased energy balance of the energy storage system without having too large an effect on the performance of the energy storage system in providing the grid service operation.

By implementing the time shift in the power demand under certain conditions (e.g. during increases in the power demand), example aspects of the present disclosure can have a technical effect of maintaining energy balance of the energy storage system, allowing for more time for the provision of revenue producing grid service operations without having to interrupt grid service operations to provide for charging of energy storage devices. In addition, the time shift implemented in responding to the power demand can be selected to only negligibly affect performance of the energy storage system in response to power demands for grid service operations.

With reference now to the FIGS., example embodiments of the present disclosure will now be discussed in detail. FIG. 1 depicts an example power system 100 that includes an energy storage system 110 according to example aspects of the present disclosure. The power system 100 can be a standalone power system or can be implemented as part of a power generation energy system, such as a wind power generation system, solar power generation system, gas turbine power generation system, or other suitable system.

The power system 100 can include a battery energy storage system (BESS) 110. The BESS 110 can include one or more battery energy storage devices 112, such as battery cells or battery packs. According to particular embodiments of the present disclosure, the battery energy storage devices 112 can contain one or more lithium-ion batteries. Due to the ability lithium-ion battery energy storage devices 112 to deliver high power, lithium-ion battery energy storage devices 112 can be particularly suitable for provide certain grid service operations, such as frequency regulation operations for an electrical grid.

Only one BESS 110 is depicted in FIG. 1 for purposes of illustration and discussion. Those of ordinary skill in the art, using the disclosures provided herein, will understand that the power system 100 can include any number of BESSs without deviating from the scope of the present disclosure. In addition, the present disclosure is discussed with reference to lithium-ion battery energy storage devices for example purposes. Other suitable energy storage devices can be used without deviating from the scope of the present disclosure, such as capacitors, fuel cells, or other battery energy storage devices.

The BESS 110 can include a battery management system (BMS) 115. The BMS 115 can include one or more electronic devices that monitor one or more of the battery energy storage devices 112, such as by protecting the battery energy storage device from operating outside a safe operating mode, monitoring a state of the battery energy storage devices, calculating and reporting operating data for the battery energy storage devices, controlling the battery energy storage devices, and/or any other suitable control actions. For example, in several embodiments, the BMS 115 can configured to monitor and/or control operation of one or more energy storage devices 112. The BMS 115 can be, for example, a logic controller implemented purely in hardware, a firmware-programmable digital signal processor, or a programmable processor-based software-controlled computer.

The BESS 110 can optionally be coupled to a power converter 120. The power converter 120 can convert a DC voltage associated with BESS 110 to suitable AC power for the AC grid 150 (e.g. 50 Hz or 60 Hz power). In some embodiments, the power converter 120 can include a combination of DC to DC converters and DC to AC converters.

The power converter 120 can include one or more electronic switching elements, such as insulated gate bipolar transistors (IGBTs). The electronic switching elements can be controlled (e.g. using pulse width modulation) to charge or to discharge the battery energy storage system 110. In addition, the electronic switching elements can be controlled to convert the DC power received or provided to the BESS 110 to suitable AC power for application to utility grid 150 (e.g., 50 Hz or 60 Hz AC power). The power converter 120 can provide AC power to the grid 150 through a suitable transformer 140 and various other devices, such as switches, relays, contactors, etc. used for protection of the power system 100.

The power system 100 can also include a control system 200 that is configured to monitor and/or control various aspects of the power system 100. In accordance with various embodiments, the control system 110 can include one or more separate control devices or can be part or can include the BMS 115 of the BESS 110.

In some embodiments, the control system 200 can receive a power demand 210 associated with a grid service operation, such as a frequency regulation operation or other grid service operation. The power demand 210 can specify a specific amount of power to be drawn from or provided to the energy storage system 110. The control system 200 can control the power converter 120 and/or the BMS 115 to provide power to or discharge power from the energy storage system 110 in accordance with the power demand 210. According to particular embodiments of the present disclosure, the control system 200 can implement one or more time shifts in the power demand 210 to improve energy balance of the energy storage system 110.

Figure 2:
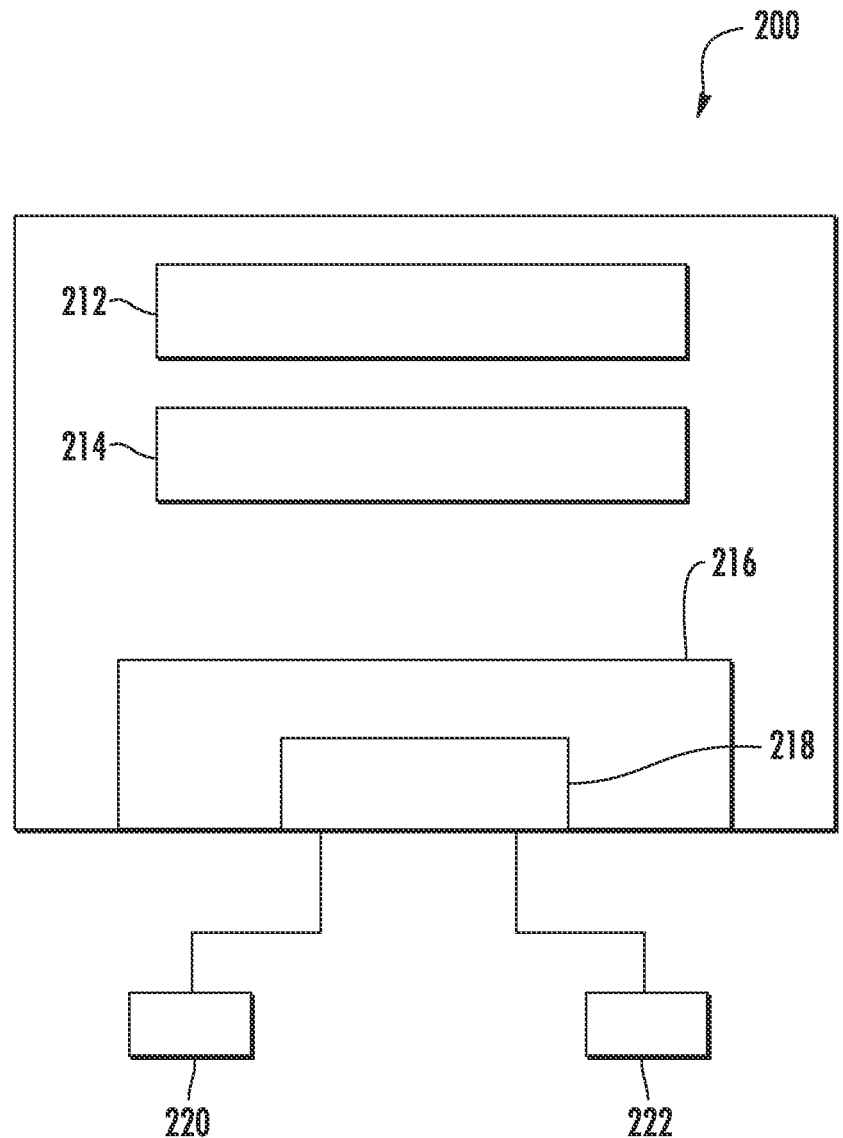
FIG. 2 depicts a control system according to example embodiments of the present disclosure.

FIG. 2 depicts an example control system 200 that includes one or more control devices according to example embodiments of the present disclosure. The control system 200 can be or can include a master control system associated with, for instance, the power system (e.g., a system level or farm level controller) and/or can include one or more controllers associated with aspects of the power system, such as one or more controllers associated with the power converter 120. The control system can include one or more processor(s) 212 and one or more memory device(s) 214. The processor(s) 212 and memory device(s) 214 can be distributed so that they are located at one more locales or with different devices.

The processor(s) 212 and memory device(s) 214 can be configured to perform a variety of computer-implemented functions and/or instructions (e.g., performing the methods, steps, calculations and the like and storing relevant data as disclosed herein). The instructions when executed by the processor(s) 212 can cause the processor(s) 212 to perform operations according to example aspects of the present disclosure. For instance, the instructions when executed by the processor(s) 212 can cause the processor(s) 212 to implement the method of FIG. 3 discussed below.

Additionally, the control system 200 can include a communications interface 216 to facilitate communications between the control system 200 and the various components of the system 100. Further, the communications interface 216 can include a sensor interface 218 (e.g., one or more analog-to-digital converters) to permit signals transmitted from one or more sensors 220, 222 to be converted into signals that can be understood and processed by the processor(s) 212. It should be appreciated that the sensors (e.g. sensors 220, 222) can be communicatively coupled to the communications interface 218 using any suitable means, such as a wired or wireless connection. The signals can be communicated using any suitable communications protocol.

As such, the processor(s) 212 can be configured to receive one or more signals from the sensors 220 and 222. For instance, in some embodiments, the processor(s) 212 can receive signals indicative of the state of charge of the energy storage system from sensor 220, such as a monitoring device configured to monitor a state of charge of the energy storage devices. In some embodiments, the processor(s) 212 can receive signals indicative of power delivery (e.g. amount of power charging/discharging) from sensor 222.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 212 can generally include memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 214 can generally be configured to store suitable computer-readable instructions that, when implemented by the processor(s) 212, configure the controller 200 to perform the various functions as described herein.

Figure 3:
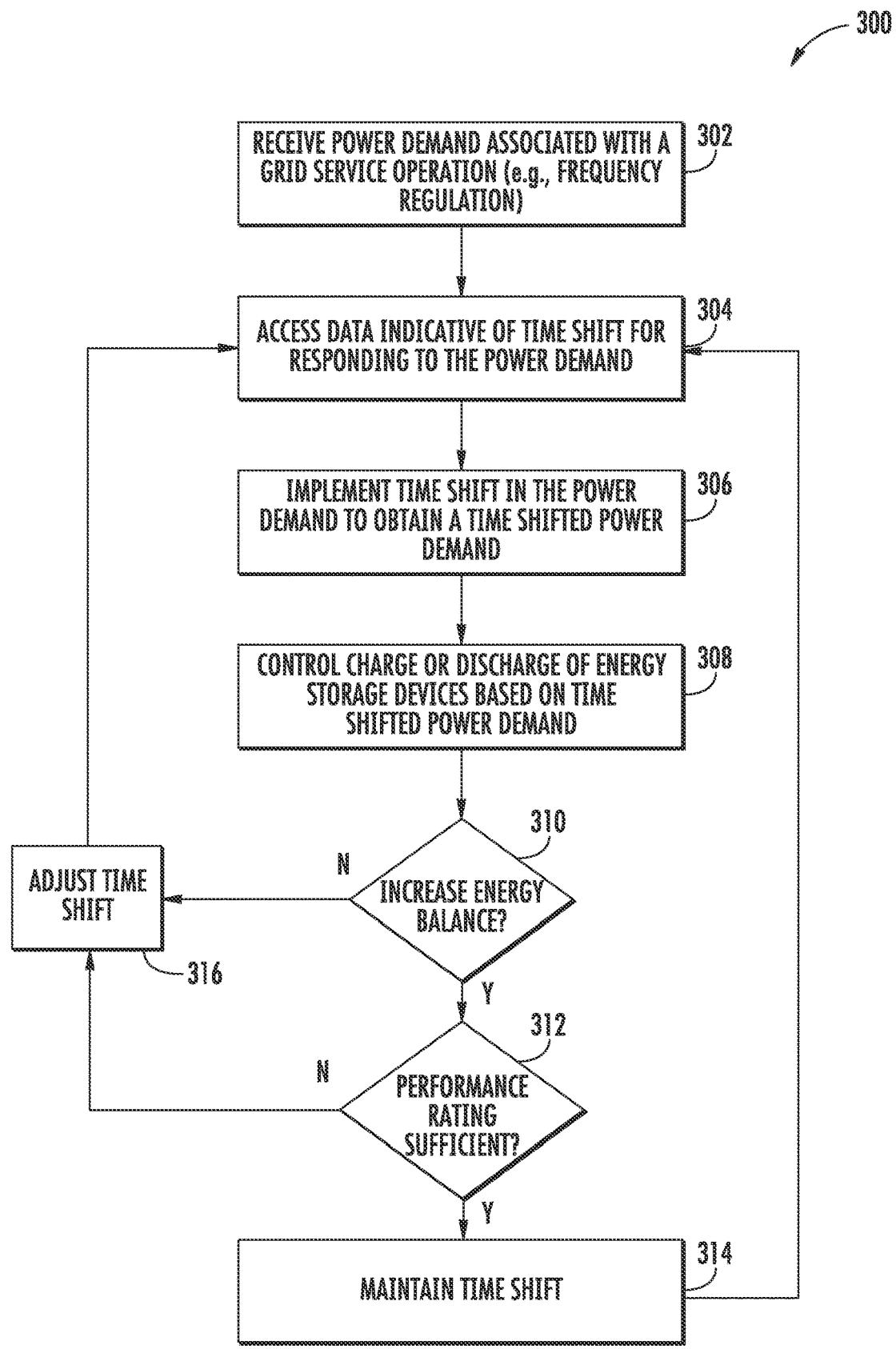
FIG. 3 depicts a flow diagram of an example method according to example embodiments of the present disclosure.

FIG. 3 depicts an example control method (300) that can be implemented by a control system (e.g., control system 200 of FIGS. 1 and 2) according to example embodiments of the present disclosure. FIG. 3 depicts steps performed in a particular order for purposes of illustration and discussion. Those of ordinary skill in the art, using the disclosures provided herein, will understand that various steps of any of the methods disclosed herein can be omitted, rearranged, expanded, and/or adapted in various ways without deviating from the scope of the present disclosure.

At (302), the method includes receiving a power demand associated with a grid service operation to be performed at least in part using an energy storage system. For instance, the control system 200 of FIG. 1 can receive power demand 210 from a utility or other entity. The grid service operation can be, for instance, a frequency regulation operation or other suitable grid service operation, such as peak shaving, ramp rate control, purchasing and selling of energy, load following, energy arbitrage, or other suitable grid service.

The power demand can specify a particular amount of power to be drawn from or provided to the energy storage system. For instance, in one embodiment, the power demand can range from about +1 MW to about −1 MW. A positive power demand can be indicative of power to be provided from the energy storage system (e.g., by discharging the energy storage devices). A negative power demand can be indicative of power to be delivered to the energy storage devices (e.g., by charging the energy storage devices). As used herein, the use of the term "about" in conjunction with a numerical value is intended to refer to within about 30% of the stated amount.

At (304), the method can include accessing data indicative of a time shift for responding to the power demand. The data indicative of the time shift can be programmed, for instance, in one or more memory devices of a control system configured to implement the power demand. For instance, the time shift can be programmed in the one or more memory devices 112 of FIG. 2.

The time shift can be selected based on numerous factors. In one embodiment, as will be discussed in more detail below, the time shift is selected to both improve energy balance of the energy storage system as well as to not have too large of an effect on a performance rating of the energy storage system in responding to the power demand. In some embodiments, the time shift can be in the range of about 1.5 second to about 50 seconds, such as about 3 seconds to about 40 seconds, such as about 10 seconds to about 20 seconds.

At (306), the time shift can be implemented in the power demand to obtain a time shifted power demand. The time shifted power demand is shifted in time relative to the power demand by the magnitude of the power demand. For instance, in an embodiment where the time shift is 3 seconds, the time shifted power demand can lag the power demand by 3 seconds in time.

In some embodiments, the time shift is implemented in the power demand when the power demand exhibits a specified condition. For instance, as will be discussed with respect to FIG. 5, the time shift can be implemented when the power demand is increasing. Otherwise, a time shift is not implemented in the power demand. For instance, the time shift is not implemented when the power demand is being maintained or is decreasing. This can allow for the increased energy balance during the performance of the grid service operation.

Figure 4:
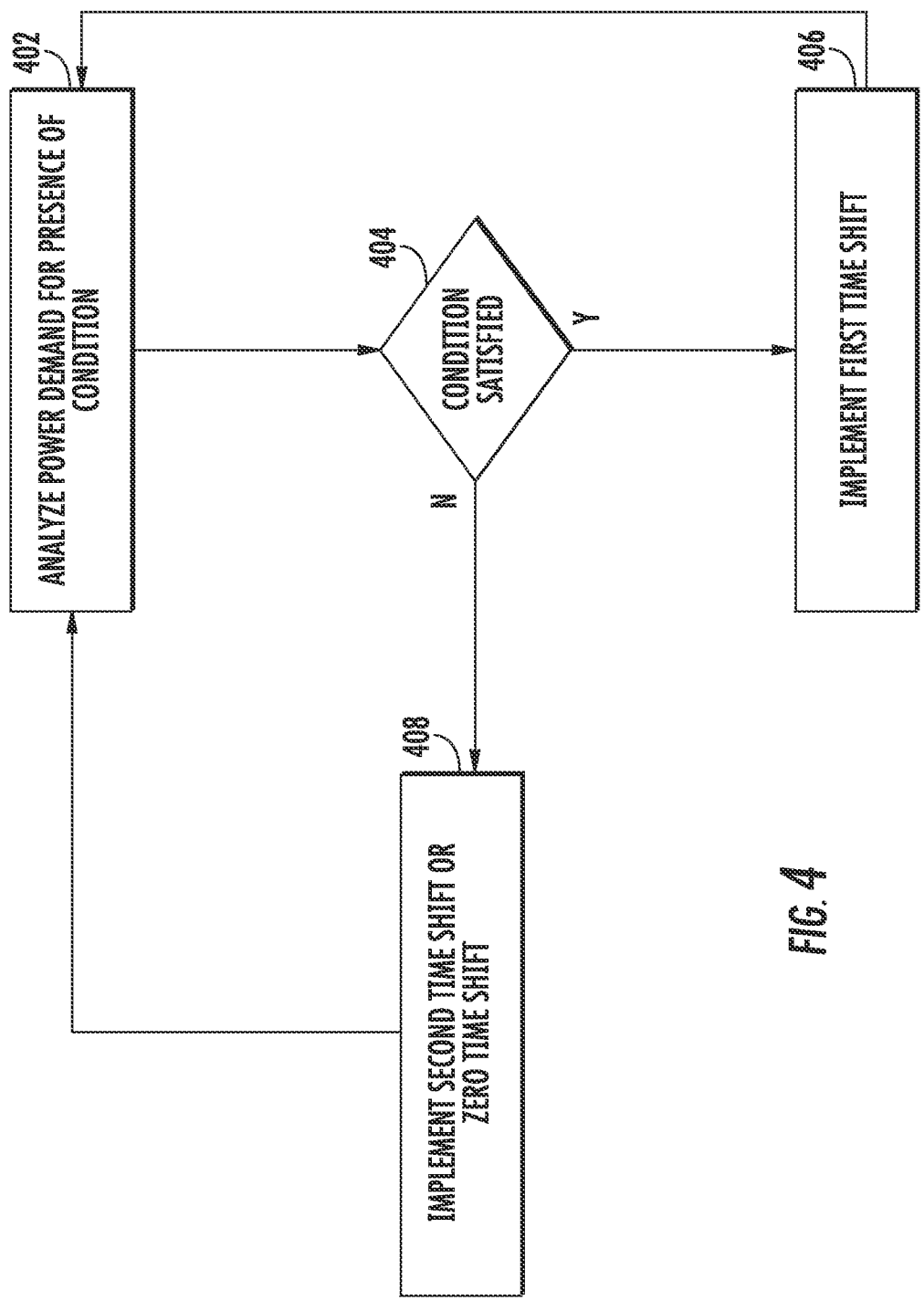
FIG. 4 depicts a flow diagram of implementing a time shift in a power demand according to example embodiments of the present disclosure.

One or more time shifts can be implemented in the power demand based on other conditions or in other manners without deviating from the scope of the present disclosure. For example, FIG. 4 shows a flow diagram of an example of implementing a time shift in power demand according to example embodiments of the present disclosure. At (402), the power demand is analyzed to determine the presence of a condition. For instance, the power demand can be analyzed to determine whether the power demand is increasing. The first condition can be based on the slope or rate of change in the power demand. For instance, the first condition can be satisfied when the power demand has a positive slope and/or the rate of change of the power demand exceeds a threshold.

If it is determined that the condition is present at (404), a first time shift can be implemented in the power demand as shown at (406). If it is not determined that the condition is present at (404), a second time shift or no time shift can be implemented in the power demand. In this way, one or more time shifts can be implemented in the power demand to obtain a time shifted power demand in various manners to achieve increased energy balance.

In some embodiments, a plurality of time shifts can be implemented in the power demand. The implementation of each time shift can be contingent on the presence of a specified condition. For instance, a first time shift can be implemented when the power demand is increasing. A second time shift can be implemented when the power demand is being maintained. The second time shift can have a different duration relative to the first time shift. No time shift can be implemented with the power demand is decreasing.

As another example, a first time shift can be implemented when the power demand has increasing at a rate that exceeds a specified threshold. A second time shift having a duration that is different from the first time shift can be implemented when the power demand is increasing at a rate that less than the specified threshold. A third time shift or no time shift can be implemented when the power demand is not increasing. Those of ordinary skill in the art, using the disclosures provided herein, will understand that a variety of different schemes for implementation of the time shift can be used without deviating from the scope of the present disclosure.

In some embodiments, one or more time shifts can be implemented in the power demand so that the energy storage devices achieve a specified state of charge at a specified time period. For example, if it is desired to be at a specified state of charge (e.g., 80%) at a certain time of day (e.g., the end of the day), one or more time shifts can be implemented in the power demand so that the state of charge approaches the specified state of charge by the specified time of day. In some embodiments, the one or more time shifts can be implemented to help maintain the state of charge in accordance with an objective function specifying desired energy levels of the energy storage system over time.

Referring back to FIG. 3 at (308), the method includes controlling charge or discharge of the energy storage devices in the energy storage system based at least in part on the time shifted power demand. For instance, the control system 200 can control the power converter 120 to charge or discharge the energy storage system 110 to provide the specified amount of power associated with the time shifted power demand (e.g., 1 MW) at the appropriate time to achieve increased energy balance.

Blocks (310) through (316) depict an optional variation of the method (300) according to example embodiments of the present disclosure that provides for tuning of the time shift to achieve increased energy balance of the energy storage system. More particularly, at (310) it is determined whether the current time shift implemented in the power demand is sufficient to achieve a change in energy balance. More specifically, the state of charge of one or more energy storage units can be monitored (e.g. by sensor 220 of FIG. 2) over a time period to determine if energy balance has increased (e.g., the state of charge is less depleted relative to a reference over a time period). If not, the method can adjust the time shift as shown at (316). The adjusted time shift can be stored in one or more memory devices and can be accessed by the control system for implementing the time shift in the power demand as shown at (304).

If the energy balance is increased, the method can continue to (312) where it can be determined whether the performance rating of the energy storage system is sufficient when the time shift is implemented in the power demand. The performance rating can be a score or metric that is indicative of the responsiveness of the energy storage system to the power demand. The performance rating can be determined by the requestor of the grid service operation (e.g., the utility), by a control system associated with the energy storage system, and/or by an operator of the energy storage system. In one embodiment, the performance rating can be determined based on a difference between a power demand and the power output of the energy storage system. In particular embodiments, the performance rating can be determined based at least on an area beneath a difference curve indicative of the difference between the power demand and the power output of the energy storage system (e.g. as measured by sensor 222 of FIG. 2).

At (312), a change in the performance rating of the energy storage system responsive to the implementation of the time shift in the power demand can be compared to a threshold. If the change is less than a threshold, the method can continue to (314) where the current time shift is maintained. Otherwise, the method can continue to (316) where the time shift is adjusted and stored in a memory for access by the control system for implementation of the adjusted time shift in the power demand.

FIG. 5 depicts a graphical representation 400 of simulation results associated with operation of an energy storage system with a time shift implemented in the power demand according to example embodiments of the present disclosure. FIG. 5 plots time along the horizontal axis. Power demand (e.g., in MW) is plotted along the left vertical axis. Percent change in state of charge is plotted along the right vertical axis.

Curve 412 represents a power demand over time associated with a grid service operation (e.g., frequency regulation operation). Curve 414 represents a time shifted power demand obtained by implementing a time shift in the power demand represented by curve 412 when the power demand is increasing. The time shift is not implemented when the power demand is decreasing. Curve 422 represents percent change in state of charge of the energy storage system based on the power demand associated with curve 412. Curve 424 represents percent change in state of charge of the energy storage system based on the time shifted power demand associated with curve 414. As demonstrated, the time shifted power demand according to example aspects of the present disclosure provides improved energy balance for the energy storage system.

Although specific features of various embodiments can be shown in some drawings and not in others, this is for convenience only. In accordance with the principles of the present disclosure, any feature of a drawing can be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling an energy storage system, comprising:
   receiving, by one or more control devices, a power demand associated with a grid service operation for an energy storage system, wherein an increase in the power demand specifies an amount of power to be discharged by the energy storage system onto the grid and a decrease in the power demand specifies an amount of power to be provided to the energy storage system from the grid;
   accessing, by the one or more control devices, data indicative of one or more time shifts for responding to the power demand, wherein a duration of the one or more time shifts are selected based on a performance rating for the energy storage system;
   generating, by the one or more control devices, a time shifted power demand based on the one or more time shifts, wherein the one or more time shifts are implemented during only the increase in power demand; and
   controlling, by the one or more control devices, power delivery to or from the one or more energy storage devices in the energy storage system during the grid service operation based on the time shifted power demand to provide the grid service operation with a delay relative to the power demand.

2. The method of claim 1, wherein a duration of the one or more time shifts is within a range of 1.5 seconds to about 50 seconds and are selected to increase energy balance of the energy storage system during the grid service operation.

3. The method of claim 1, wherein the grid service operation comprises a frequency regulation operation for the grid.

4. The method of claim 1, wherein the performance rating is indicative of the responsiveness of the energy storage system to the power demand.

5. The method of claim 1, wherein the one or more energy storage devices comprise lithium ion batteries.

* * * * *